(12) United States Patent
Alam et al.

(10) Patent No.: US 9,098,957 B1
(45) Date of Patent: Aug. 4, 2015

(54) REMOTE CONTROL OF VEHICULAR WIRELESS ROUTER SETTINGS

(71) Applicants: General Motors LLC, Detroit, MI (US); GM Global Technology Operations LLC, Detroit, MI (US)

(72) Inventors: Muhammad Fahad Alam, Macomb, MI (US); Jonathan L. Gerlach, Canton, MI (US); Dipankar Pal, Sylvania, OH (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 0 days.

(21) Appl. No.: 14/156,969

(22) Filed: Jan. 16, 2014

(51) Int. Cl.
*G01M 17/00* (2006.01)
*G07C 5/00* (2006.01)
*H04W 12/06* (2009.01)
*H04W 76/02* (2009.01)

(52) U.S. Cl.
CPC .............. *G07C 5/008* (2013.01); *H04W 12/06* (2013.01); *H04W 76/02* (2013.01); *H04W 76/025* (2013.01)

(58) Field of Classification Search
CPC . H04W 76/02; H04W 76/021; H04W 76/025; H04W 36/0055; H04B 7/12

USPC ............. 701/31.5; 455/73, 456.1, 432.1, 421; 370/338, 282

See application file for complete search history.

(56) References Cited

U.S. PATENT DOCUMENTS

| 7,227,475 | B1* | 6/2007 | Provenzano et al. ..... 340/995.24 |
| 7,912,641 | B2* | 3/2011 | Osentoski et al. ........... 701/29.3 |
| 2005/0057373 | A1* | 3/2005 | Noguchi ..................... 340/932.2 |
| 2005/0249145 | A1* | 11/2005 | Wilson .......................... 370/316 |
| 2013/0138714 | A1* | 5/2013 | Ricci ............................. 709/201 |
| 2013/0185152 | A1* | 7/2013 | Aaron et al. ............... 705/14.51 |

* cited by examiner

*Primary Examiner* — Gertrude Arthur Jeanglaud
(74) *Attorney, Agent, or Firm* — Anthony Luke Simon; Reising Ethington P.C.

(57) ABSTRACT

A method of controlling a wireless hotspot at a vehicle includes receiving one or more Wi-Fi control variables along with a vehicle identity at a central facility; authenticating the received Wi-Fi control variables at the central facility using the vehicle identity; establishing a cellular connection between the central facility and a vehicle providing the Wi-Fi hotspot identified by the transmitted vehicle identity; and transmitting a command to change the Wi-Fi control variables from the central facility to the vehicle when the Wi-Fi control variables have been authenticated.

19 Claims, 2 Drawing Sheets

REMOTE CONTROL OF VEHICULAR WIRELESS ROUTER SETTINGS

TECHNICAL FIELD

The present invention relates to vehicles and more particularly to the regulation and/or control of wireless or Wi-Fi hotspots provided by vehicles.

BACKGROUND

Vehicles have used vehicle telematics units to monitor vehicle functions and provide communications services. Recently, vehicle telematics units have begun providing short-range wireless communications access to users of wireless devices in close proximity to the vehicle, such in the form of a Wi-Fi hotspot. Wherever the vehicle moves, the vehicle telematics unit can offer and provide a connection to wireless devices that are within a limited range of the vehicle. However, providing short-range wireless access can involve the administration of a number of settings that generally govern the terms under which the vehicle telematics unit and the wireless devices exchange data. For example, these settings can include establishing and changing a password used to access the Wi-Fi hotspot.

With respect to fixed wireless routers used with immobile Wi-Fi hotspots, settings are often monitored and changed using a personal computer (PC) that is in wired, direct communication with the fixed router. That is, the PC and the fixed wireless router are directly linked (e.g., via an Ethernet cable) and a user can input router settings at a keyboard of the PC that command the fixed wireless router to alter its configuration. In contrast, vehicle telematics units that provide Wi-Fi hotspots are not usually connected directly to a PC or other such device and even if the vehicle telematics unit were, it may not be desirable to permit local control of the Wi-Fi hotspot using the PC.

SUMMARY

According to an embodiment of the disclosure, there is provided a method of controlling a wireless hotspot at a vehicle. The method comprises the steps of receiving one or more Wi-Fi control variables along with a vehicle identification at a central facility; authenticating the received Wi-Fi control variables at the central facility; establishing a cellular connection between the central facility and a vehicle providing a Wi-Fi hotspot identified by the transmitted vehicle identification; and transmitting a command from the central facility to the vehicle when the Wi-Fi control variables have been authenticated.

According to another embodiment of the disclosure, there is provided a method of controlling a wireless hotspot at a vehicle. The method comprises the steps of providing a Wi-Fi hotspot at the vehicle; establishing a short-range wireless link between the vehicle and a wireless device using the Wi-Fi hotspot; receiving at the vehicle one or more Wi-Fi control variables from the wireless device; transmitting the Wi-Fi control variables and a vehicle identity from the vehicle to a central facility; and receiving at the vehicle permission from the central facility to control the Wi-Fi hotspot to match the one or more Wi-Fi control variables transmitted to the central facility.

According to yet another embodiment of the disclosure, there is provided a method of controlling a wireless hotspot at a vehicle. The method comprises the steps of receiving one or more Wi-Fi diagnostic commands at a central facility along with a vehicle identification; authenticating the Wi-Fi diagnostic commands at the central facility; generating a command at the central facility that initiates Wi-Fi diagnostic activity at the vehicle; and transmitting the generated command to change the Wi-Fi control variables from the central facility to the vehicle identified by the vehicle identification via a wireless carrier system using the vehicle identification.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below controls a Wi-Fi hotspot provided by a vehicle.

Control can involve changing functional settings for the Wi-Fi hotspot as well as initiating diagnostic activities that can identify and/or remedy problems with the Wi-Fi hotspot. Local control of a Wi-Fi hotspot at the vehicle is often not possible and/or desirable. As a result, an authorized user can enter Wi-Fi setting or control selections at a handheld wireless device or PC and send those selections to a central facility with a vehicle identifier. The central facility can then authenticate the user and/or selections and then transmit the selections to the vehicle hosting the Wi-Fi hotspot. The vehicle, through its vehicle telematics unit, can then receive the transmitted selections and then optionally confirm that the selections have been applied and/or executed through a message to the authorized user, such as via text messaging or email.

Figure 1:
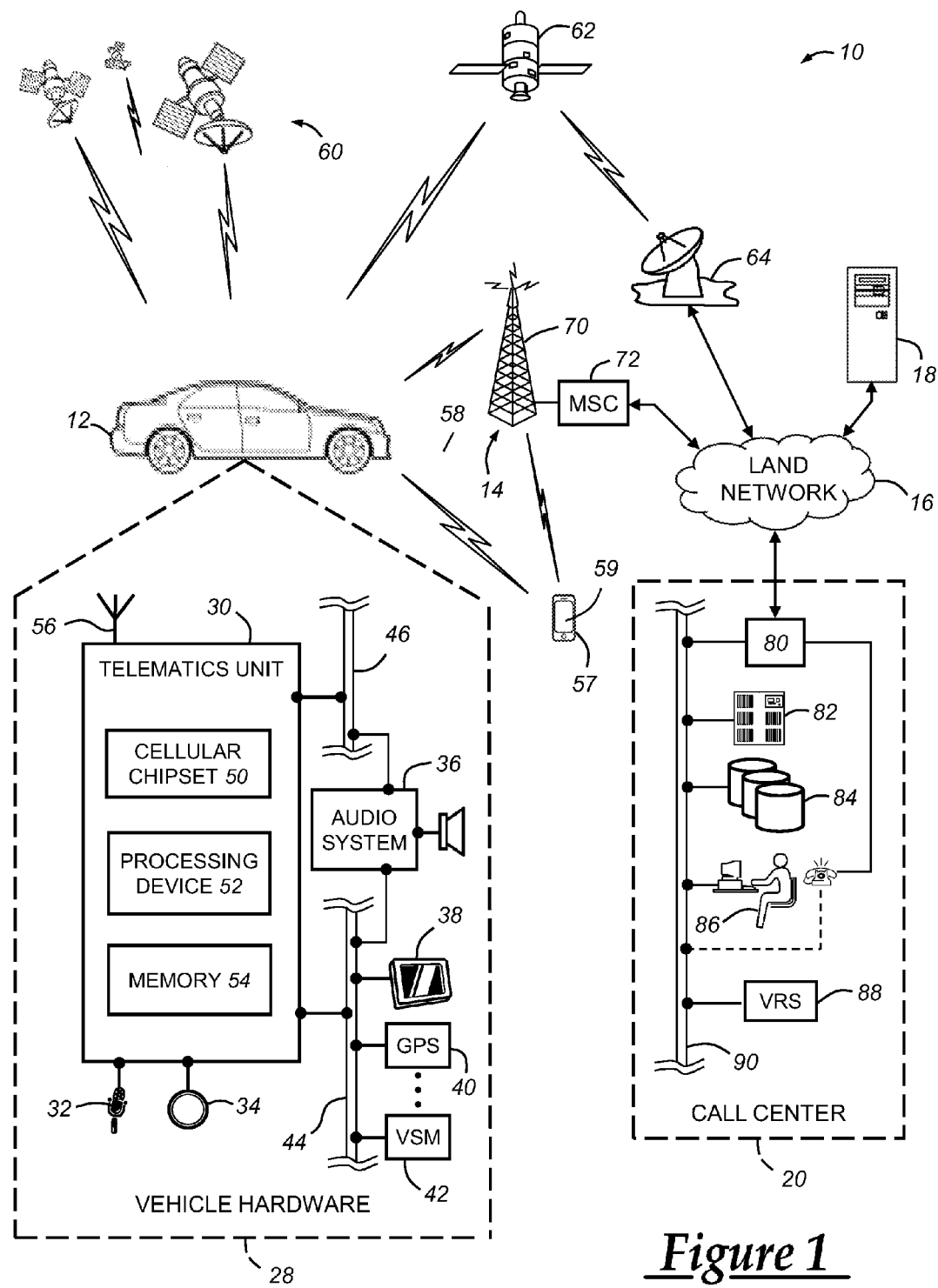
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46.

Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. as well as others. While the smart phone 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1xEV-DO) or GSM/GPRS (e.g., 4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
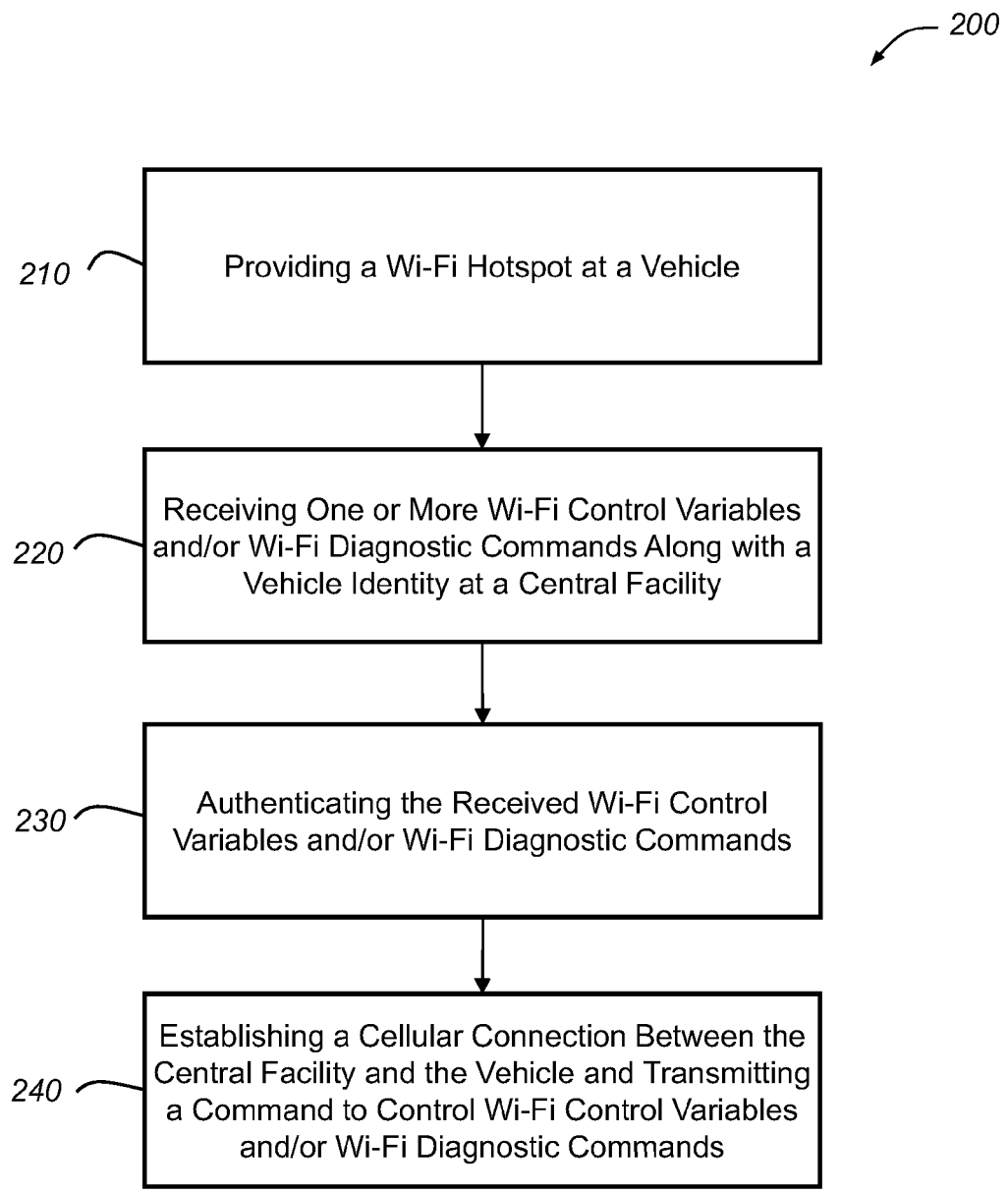
FIG. 2 is a flow chart of an embodiment of a method of controlling a Wi-Fi hotspot at a vehicle.

Turning now to FIG. 2, there is shown an embodiment of a method 200 of controlling a wireless hotspot at the vehicle 12. The method 200 begins at step 210 by providing a Wi-Fi hotspot at the vehicle 12. A Wi-Fi hotspot generally refers to a wireless access point or a wireless local area network (WLAN). While the wireless access point or WLAN will be described as "Wi-Fi," "Wi-Fi service," or a "Wi-Fi hotspot," these terms also include any one of the IEEE 802.11 standards used for short-range communications. While this embodiment will be described in terms of a "Wi-Fi hotspot," it should be appreciated that other wireless protocols can also be used, such as the WiMax standard governed by the standards set forth in IEEE 802.16. The vehicle 12 can provide the Wi-Fi service using equipment and software that wirelessly communicates data between one or more clients (e.g., mobile or wireless devices) and the wireless carrier system 14. In one example, this equipment can be implemented using the vehicle telematics unit 30 and antenna 56. Through such hardware as the vehicle telematics unit 30, the vehicle can provide Wi-Fi service to a local area surrounding the vehicle. The equipment and software for implementing the Wi-Fi service can also operate according to one or more Wi-Fi control variables that can be changed by a person authorized to do so. Examples of the Wi-Fi control variables include setting the network name (service set identifier (SSID)) broadcast by the Wi-Fi hotspot, turning the Wi-Fi Hotspot on/off, choosing the security protocol (e.g., WEP, WPA2, etc.) employed at the Wi-Fi hotspot, setting and re-setting the password used to access the Wi-Fi hotspot, and control of the encryption techniques used at the Wi-Fi hotspot.

In addition to Wi-Fi control variables, the Wi-Fi hotspot can also receive one or more Wi-Fi diagnostic commands that may be used to diagnose any problems the Wi-Fi hotspot experiences. A user of a wireless device can determine that the Wi-Fi hotspot is not functioning properly. Then authorized users can generate Wi-Fi diagnostic commands that can check one or more diagnostic variables. Examples of the diagnostic variables to be monitored in response to diagnostic commands include whether or not the vehicle is currently being operated (e.g., the vehicle ignition switch is detected to be "on"), whether the vehicle telematics unit 30 is accessible via a cellular call, the amount of data passing through the Wi-Fi hotspot, the radio access technology (RAT) currently used by the vehicle 12 (e.g., LTE, 3G, etc.), the number of devices currently connected, and the identity of the SSID being broadcast, to name a few. While both the Wi-Fi control variables and the Wi-Fi diagnostic commands have been described using the term Wi-Fi, it should be appreciated that these concepts include other wireless standards for short-range wireless communication, such as WiMAX. The method 200 proceeds to step 220.

At step 220, one or more Wi-Fi control variables are received along with a vehicle identity at a central facility. The user who is authorized to control the Wi-Fi hotspot can set or change the Wi-Fi control variables and execute Wi-Fi diagnostic commands from a remote location. For instance, the user can enter the Wi-Fi control variables/Wi-Fi diagnostic commands into a graphic user interface shown on display 59 of the smart phone 57. The display 59 can offer the user a virtual keyboard with which the user can input data for the Wi-Fi control variables, such as changing passwords or changing the SSID. The display 59 can also present to the user various selectable buttons that control one or more options for each Wi-Fi control variable or Wi-Fi diagnostic commands. Other electronic devices can be used to receive the Wi-Fi control variables and/or the Wi-Fi diagnostic commands. For example, the authorized user enter these variables and/or commands can into a PC. The one or more Wi-Fi control variables or Wi-Fi diagnostic commands can be received from the wireless device/PC at the central facility. Along with the Wi-Fi control variables and/or Wi-Fi diagnostic commands, the user can also send a vehicle identification. This can be used by the central facility to identify the vehicle 12 hosting the Wi-Fi hotspot that is to be controlled. In one example, the vehicle identification can be a vehicle identification number (VIN). However, the vehicle Wi-Fi hotspot can also be identified by an electronic serial number (ESN), a mobile dialed number (MDN), mobile identification number (MIN), international mobile subscriber identity (IMSI), or other similar string of alphanumeric characters that can identify the vehicle 12 or vehicle telematics unit 30.

The Wi-Fi control variables and/or the Wi-Fi diagnostic commands can be transmitted to the central facility, such as the call center 20 or the computer 18. Once the wireless device, such as the smart phone 57, or PC receives the data or selections for the Wi-Fi control variables and/or the Wi-Fi diagnostic commands, that data or those selections can be sent in a variety of ways. In one example, the wireless device can communicate via any Wi-Fi hotspot the device can establish a short-range wireless communication link with, such as one provided by a building. However, the wireless device can also transmit the Wi-Fi control variables or Wi-Fi diagnostic commands from the wireless device to the central facility using the Wi-Fi hotspot provided by the vehicle 12. In yet another example, the Wi-Fi control variables/Wi-Fi diagnostic commands can be sent from a PC to the central facility through the land network 16. The method proceeds to step 230.

At step 230, the received Wi-Fi control variables are authenticated at the central facility and permission is given to control the Wi-Fi hotspot to match the one or more Wi-Fi control variables transmitted to the central facility. Upon receiving the Wi-Fi control variables or Wi-Fi diagnostic commands, the central facility determines whether the user sending the Wi-Fi control variables or Wi-Fi diagnostic commands is authorized to do so. The user can be authenticated in a variety of ways. For example, the user can include a password when sending the Wi-Fi control variables or Wi-Fi diagnostic commands to the central facility. Or in another example, the user can maintain at the wireless device a private key with which the device can encode a hash to send to the central facility. When received, a corresponding public key can be used to determine that the hash was created by an authenticated user. While these are some examples of how a user can be authenticated, those skilled in the art will appreciate that others are possible. The method 200 proceeds to step 240.

At step 240, a cellular connection is established between the central facility and the vehicle 12, identified by the transmitted vehicle identity, that provides the Wi-Fi hotspot. Using the cellular connection, a command can be transmitted to the vehicle from the central facility to change the Wi-Fi control variables or execute Wi-Fi diagnostic commands when the Wi-Fi control variables/Wi-Fi diagnostic commands have been authenticated. After determining that the Wi-Fi control variables, the Wi-Fi diagnostic commands, and/or the user are authorized to make changes to the vehicular Wi-Fi hotspot or execute diagnostic commands, the central facility can then implement those variables/commands. The central facility, using the vehicle identifier discussed above, can contact the vehicle 12 via the vehicle telematics unit 30 and transmit computer-readable commands that are understandable by the unit 30 to cause the unit 30 to change Wi-Fi control variables or execute Wi-Fi diagnostic commands at the vehicle 12. After changing the Wi-Fi control variables or completing the Wi-Fi diagnostic commands, the vehicle telematics unit 30 can confirm these actions with a confirmation message, which can be in the form of a text (SMS) message or an email message. In one implementation, this confirmation message can be sent from the vehicle telematics unit 30 to the user via a pre-stored contact telephone number saved at the vehicle 12. Or in another implementation, the vehicle telematics unit 30 can transmit a signal to the central facility indicating that changes to the Wi-Fi control variables or execution of the diagnostic commands are complete via the cellular connection. The central facility can then generate the confirmation message and transmit it to the user. The confirmation message can provide another layer of security to alert a user associated with the vehicle Wi-Fi hotspot if any changes are made—authorized or not. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a wireless hotspot at a vehicle, comprising the steps of:
    (a) receiving one or more Wi-Fi control variables along with a vehicle identification at a central facility;
    (b) authenticating the received Wi-Fi control variables at the central facility;
    (c) establishing a cellular connection between the central facility and a vehicle providing a Wi-Fi hotspot identified by the transmitted vehicle identification; and
    (d) transmitting a command to change the Wi-Fi control variables from the central facility to the vehicle when the Wi-Fi control variables have been authenticated.

2. The method of claim 1, further comprising the step of sending a message to an authorized user confirming the transmitted command to change the Wi-Fi control variables.

3. The method of claim 1, further comprising the steps of receiving one or more Wi-Fi diagnostic commands at the central facility and transmitting a command from the central facility to the vehicle that causes the vehicle to monitor one or more diagnostic variables.

4. The method of claim 1, further comprising the step of entering the Wi-Fi control variables into a wireless device.

5. The method of claim 1, further comprising the step of transmitting the Wi-Fi control variables and the vehicle identification from a wireless device to the central facility via the Wi-Fi hotspot at the vehicle.

6. The method of claim 1, further comprising the step of transmitting the Wi-Fi control variables and the vehicle identification from a wireless device to the central facility via a Wi-Fi hotspot that is separate from the Wi-Fi hotspot at the vehicle.

7. The method of claim 1, further comprising the step of authenticating the user with a password or a private key maintained at a wireless device.

8. A method of controlling a wireless hotspot at a vehicle, comprising the steps of:
    (a) providing a Wi-Fi hotspot at the vehicle;
    (b) establishing a short-range wireless link between the vehicle and a wireless device using the Wi-Fi hotspot;
    (c) receiving at the vehicle one or more Wi-Fi control variables from the wireless device;
    (d) transmitting the Wi-Fi control variables and a vehicle identity from the vehicle to a central facility; and
    (e) receiving at the vehicle permission from the central facility to control the Wi-Fi hotspot to match the one or more Wi-Fi control variables transmitted to the central facility.

9. The method of claim 8, further comprising the step of sending a message to an authorized user confirming the permission to control the Wi-Fi hotspot.

10. The method of claim 8, further comprising the steps of receiving one or more Wi-Fi diagnostic commands from the wireless device and transmitting the Wi-Fi diagnostic commands to the central facility.

11. The method of claim 10, further comprising the step of receiving at the vehicle a command to monitor one or more diagnostic variables.

12. The method of claim 8, further comprising the step of entering the Wi-Fi control variables into the wireless device.

13. The method of claim 8, further comprising the step of authenticating the Wi-Fi control variables with a password or a private key maintained at the wireless device.

14. A method of controlling a wireless hotspot at a vehicle, comprising the steps of:
   (a) receiving one or more Wi-Fi diagnostic commands at a central facility along with a vehicle identification;
   (b) authenticating the Wi-Fi diagnostic commands at the central facility;
   (c) generating a command at the central facility that initiates Wi-Fi diagnostic activity at the vehicle; and
   (d) transmitting the generated command from the central facility to the vehicle identified by the vehicle identification via a wireless carrier system using the vehicle identification.

15. The method of claim 14, further comprising the step of sending a message to an authorized user confirming the transmitted command to initiate Wi-Fi diagnostic activity at the vehicle.

16. The method of claim 14, further comprising the step of selecting one or more vehicle diagnostic commands at a wireless device.

17. The method of claim 14, further comprising the step of transmitting the Wi-Fi diagnostic commands and the vehicle identification from a wireless device to the central facility via the Wi-Fi hotspot at the vehicle.

18. The method of claim 14, further comprising the step of transmitting the Wi-Fi diagnostic commands and the vehicle identification from a wireless device to the central facility via a Wi-Fi hotspot that is separate from the Wi-Fi hotspot at the vehicle.

19. The method of claim 14, further comprising the step of authenticating the Wi-Fi diagnostic commands with a password or a private key maintained at a wireless device.

\* \* \* \* \*